(12) United States Patent
Dong et al.

(10) Patent No.: US 11,177,656 B2
(45) Date of Patent: Nov. 16, 2021

(54) SYSTEMS AND METHODS FOR OPTIMIZING BUILDING-TO-GRID INTEGRATION

(71) Applicants: Bing Dong, Helotes, TX (US); Ahmad Taha, San Antonio, TX (US); Nikolaos Gatsis, San Antonio, TX (US); Zhaoxuan Li, San Antonio, TX (US); Ankur Pipri, San Antonio, TX (US)

(72) Inventors: Bing Dong, Helotes, TX (US); Ahmad Taha, San Antonio, TX (US); Nikolaos Gatsis, San Antonio, TX (US); Zhaoxuan Li, San Antonio, TX (US); Ankur Pipri, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 69 days.

(21) Appl. No.: 16/003,570

(22) Filed: Jun. 8, 2018

(65) Prior Publication Data
US 2018/0358810 A1 Dec. 13, 2018

Related U.S. Application Data

(60) Provisional application No. 62/516,830, filed on Jun. 8, 2017.

(51) Int. Cl.
| | |
|---|---|
| *H02J 3/00* | (2006.01) |
| *H02J 3/38* | (2006.01) |
| *G05B 19/042* | (2006.01) |
| *G05B 15/02* | (2006.01) |
| *H02J 3/12* | (2006.01) |

(52) U.S. Cl.
CPC .............. *H02J 3/003* (2020.01); *G05B 15/02* (2013.01); *G05B 19/0428* (2013.01); *H02J 3/12* (2013.01); *H02J 3/381* (2013.01); *G05B 2219/2639* (2013.01); *H02J 2310/64* (2020.01)

(58) Field of Classification Search
CPC .......... G05B 2219/2639; Y04S 20/222; Y04S 50/10; Y02A 30/60
See application file for complete search history.

(56) References Cited

U.S. PATENT DOCUMENTS

| | | | |
|---|---|---|---|
| 6,625,520 B1* | 9/2003 | Chen | ......................... H02J 3/00 700/286 |
| 2004/0039490 A1* | 2/2004 | Kojima | .................. G06Q 50/06 700/287 |
| 2005/0048337 A1* | 3/2005 | Matsubayashi | ... H01M 8/04604 702/60 |
| 2005/0102068 A1* | 5/2005 | Pimputkar | ........ H02J 13/00006 700/291 |

(Continued)

*Primary Examiner* — Santosh R Poudel
(74) *Attorney, Agent, or Firm* — Thomas | Horstemeyer, LLP

(57) ABSTRACT

A computing device can generate predictions for future consumptions for one or more buildings based on a variety of factors. The factors can include a local climate corresponding to each building, a mass and heat transfer for each building, a daily operation for each building, and an occupancy behavior for each building. A power flow can be determined for one or more power generators. The power flow can be determined based on the predictions of future consumption. A control input vector can be determined for the one or more buildings.

20 Claims, 11 Drawing Sheets

(56) References Cited

U.S. PATENT DOCUMENTS

| | | | | |
|---|---|---|---|---|
| 2011/0270459 | A1* | 11/2011 | Murai | H02J 3/14 |
| | | | | 700/295 |
| 2012/0330626 | A1* | 12/2012 | An | G01K 17/20 |
| | | | | 703/2 |
| 2013/0218360 | A1* | 8/2013 | Najewicz | H02J 3/14 |
| | | | | 700/294 |
| 2014/0142772 | A1* | 5/2014 | Kubota | G06Q 50/06 |
| | | | | 700/291 |
| 2016/0054019 | A1* | 2/2016 | Lee | F24F 11/30 |
| | | | | 700/276 |
| 2016/0226261 | A1* | 8/2016 | Yano | B60L 55/00 |
| 2017/0179716 | A1* | 6/2017 | Vitullo | G05B 13/048 |
| 2017/0186108 | A1* | 6/2017 | Itaya | G06Q 50/06 |
| 2018/0115561 | A1* | 4/2018 | Sun | G05B 23/0208 |
| 2018/0138710 | A1* | 5/2018 | Kocarev | H02J 3/32 |
| 2018/0159184 | A1* | 6/2018 | Nishida | G05B 13/026 |

\* cited by examiner

SYSTEMS AND METHODS FOR OPTIMIZING BUILDING-TO-GRID INTEGRATION

CROSS-REFERENCE TO RELATED APPLICATIONS

This application claims the benefit of U.S. Provisional Application No. 62/516,830, filed Jun. 8, 2017, the entire contents of which is hereby incorporated herein by reference.

BACKGROUND

By 2050, a staggering 70% of the world's population is predicted to live and work in cities. A recent assessment from the World Bank suggested that two-thirds of global energy consumption can be attributed to cities, leading to 71% of global direct energy-related greenhouse gas emissions. Smart cities can include sustainable and resilient infrastructures, where buildings are a major constituent. Building energy consumption contributes to more than 70% of electricity usage, which can profoundly impact power grid operations. It would be beneficial to improve efficiency of the building energy consumption while simultaneously generating power more efficiently.

BRIEF DESCRIPTION OF THE DRAWINGS

For a more complete understanding of the embodiments and the advantages thereof, reference is now made to the following description, in conjunction with the accompanying figures briefly described as follows.

Figure 1:
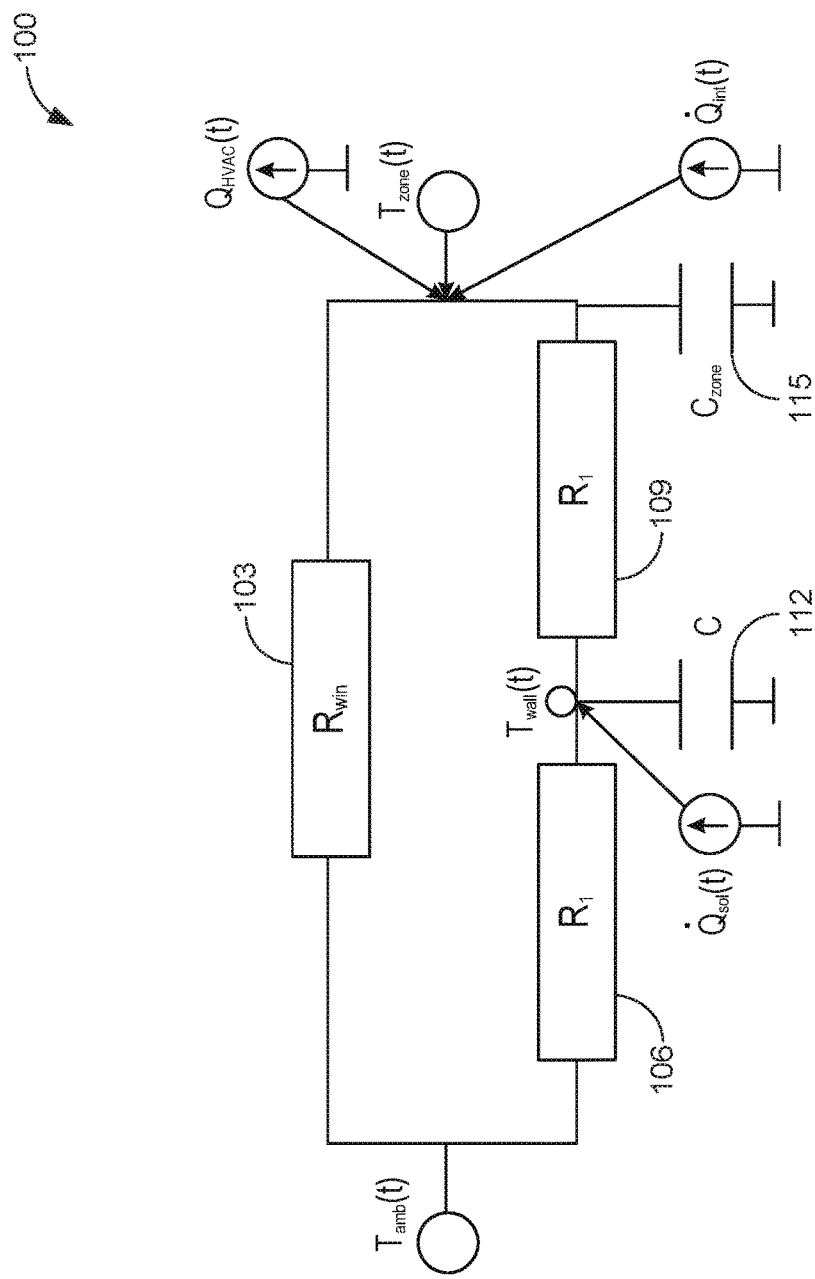
FIG. 1 is a schematic diagram of an RC-network model for a thermal zone according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present disclosure" is not to suggest that all embodiments must include the referenced feature(s).

Among embodiments, some aspects of the present disclosure are implemented by a computer program executed by one or more processors, as described and illustrated. As would be apparent to one having ordinary skill in the art, the present disclosure may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The embodiments in the present disclosure are capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Turning now to the drawings, exemplary embodiments are described in detail. Disclosed are various embodiments of a mathematical framework for Buildings-to-Grid (BtG) integration in smart cities. In some embodiments, the framework can include explicitly couple power grid and building's control actions and operational decisions. The explicit coupling can be utilized by buildings and power grids operators to simultaneously optimize the performance of both. High-level dynamics of building clusters and building-integrated power networks with algebraic equations are presented—both operating at different time-scales. A model predictive control (MPC)-based algorithm is discussed herein that formulates the BtG integration and accounts for the time-scale discrepancy. The formulation captures the dynamic and algebraic power flow constraints of power networks. The formulation is shown to have numerous advantages. A high-fidelity discretization for the formulation can be used. The findings discussed herein demonstrate building energy savings and significant frequency regulation, while these findings carry over in network simulations with nonlinear power flows and mismatch in load and weather predictions.

Cities can be equipped with optimized building designs that have the auspicious potential to play a pivotal role in reducing global energy consumption while maintaining stable electric-grid operations. As buildings are physically connected to the electric power grid, an understanding of the coupling of buildings can be used to develop the framework for buildings-to-grid integration.

Buildings-to-Grid (BtG) integration can include a breadth of computational and experimental aspects. An experimental high-level architecture can enable smart buildings with a focus on heating, ventilating, and air conditioning (HVAC) systems and grid integration. An optimization application can be executed in a computing device to provide an optimization framework. The optimization framework can be a bi-level. The bi-level optimization framework can be used for commercial buildings among other building types and can be integrated with a distribution grid. Detailed dynamic models for buildings with multiple zones (upper level) and an operational model for the distribution grid with voltage/current balance equations (lower level) can be included. Nonetheless, a transient model of the power grid, capturing frequency deviation may be missing.

The regulation service provision by smart buildings can be investigated. Price signals can be exchanged between grid and building operators to alter building energy consumption. BtG integration can result in the grid-aware building of HVAC controls that can provide frequency regulation or other ancillary services to the grid, largely without sacrificing the occupants' comfort. The load-shifting capability of buildings can also be utilized. An account of the grid dynamics and power flows has not previously been explored.

HVAC controls and building dynamics as linearized dynamical systems can be modeled. The modeling particulars can depend on the size of the building cluster. As the number of buildings involved in the analysis increases, the dynamic models tend to become simpler—for computational purposes. A typical thermal resistance and capacitance circuit model can be used to represent heat transfer and thermodynamic properties of the building envelope, and can be used in building control studies. Various control routines can be developed for building controls. Commercial buildings can use PID controllers for HVAC systems. However, model predictive control (MPC) can be used with respect to PID controllers. Building HVAC-MPC can be looked at in view of stochastic/deterministic, linear/nonlinear, centralized/decentralized, explicit/implicit architectures. Significant energy savings can be shown given different system dynamics, forecast and parametric uncertainty, and computational limitations.

None of current systems include a high-level mathematical framework that buildings and power grids operators can simultaneously utilize to optimize their performance. A framework is discussed herein that can couple power grid and building control actions and operational decisions. Creating a framework can include challenges. For example, building control systems are not typically connected to each other, nor are they integrated with the grid. Consequently, a unified optimal energy control strategy—even if it is decentralized—can require a framework that facilitates this integration, in addition to the willingness of building operators to contribute to this framework. Additionally, grid and building dynamics and control actions can operate at two different time-scales. While the grid controls and states are often in milliseconds and seconds, the building state dynamics and controls can be significantly slower, often in minutes. Coupling the two dynamic systems together entails addressing this time-scale discrepancy. Existence of algebraic equations in grid dynamics, resulting in differential algebraic equations (DAE), coupled with the different time-scales, can complicate the modeling and analysis of BtG integration. In fact, these algebraic equations can depict the interdependence between grid and building dynamics. A mathematical framework can be used that addresses the aforementioned challenges.

One objective can be to generate high-level local control actions/signals for buildings and power generators such that the overall performance can be optimized in terms of stability, energy savings, and/or other socio-economic metrics. The inclusion of the dynamics of various distributed energy resources (DER) and other building control routines can be facilitated.

The patterns of energy usage in buildings can be impacted by local climate, heat and mass transfer of building envelope, daily operation, and occupancy behaviors in buildings. Detailed energy models can be developed based on physics and statistics to simulate the mass and heat transfer in buildings. For a large-scale application such as BtG integration, it may be unrealistic to consider every thermal zone of each building—thousands of buildings will generate millions of zones. This can produce a highly intractable BtG integration problem. Hence, at a BtG integration level, the amount of cooling energy needed, which is optimized to minimize the total operation cost from buildings to the grid, will be allocated to each building; we define this quantity as $P^{(l)}_{HVAC}$ for building l. Then, at the local level of building l, the decision variables of air-side system (i.e., set-points for air-handling units, damper opening for terminal systems) and water side system (flows for pumps, chiller temperature set-points) can be optimized to maintain preferred zone temperature, while not exceeding the cooling load limits set by $P_{HVAC}^{(l)}$ The cooling load can be solved for as a high-level problem and then feed with the set points to the lower level problems. The high-level building problem can use a thermal resistance and capacitance (RC) network model to represent heat transfer and thermodynamics of building envelope. The RC network model assumes a steady-state heat transfer through building envelope. Considering building envelope has time constant of hours, this model can be used for a high-level BtG integration analysis. A model 100 with three resistances 103, 106, and 109, and two capacitances 112 and 115 (3R-2C) is shown in FIG. 1. In this model, a building is treated as a super-zone where the resistance parameters represent the thermal resistance of the whole building structure, external facades' convection, and internal walls' convection. The building dynamics with temperature states $T_{wall}$ and $T_{zone}$ can be written as:

$$\dot{T}_{wall}(t) = \frac{T_{amb}(t) - T_{wall}(t)}{CR_2} + \frac{T_{zone}(t) - T_{wall}(t)}{CR_1} + \frac{\dot{Q}_{sol}(t)}{C}$$

$$\dot{T}_{zone}(t) = \frac{T_{wall}(t) - T_{zone}(t)}{C_{zone}R_1} + \frac{T_{amb}(t) - T_{zone}(t)}{C_{zone}R_{win}} + \frac{\dot{Q}_{int}(t) + \dot{Q}_{HVAC}(t)}{C_{zone}},$$

where $R_{win}$, $R_2$, and $R_1$ are physical parameters of building envelope; C is a lumped thermal capacity of all walls and roof; $C_{zone}$ is the thermal capacity of the zone; $\dot{Q}_{sol}(t)$ is the total absorbed solar radiation on the external wall; $\dot{Q}_{int}(t)$ is the total internal heat gains from space heat sources such as desktop, people, and lights; $T_{amb}(t)$; $T_{zone}(t)$, and $T_{wall}(t)$ are the outside ambient, wall, and zone/space temperatures, respectively. The cooling load can be calculated as $\dot{Q}_{HVAC}(t) = \mu_{HVAC} P_{HVAC}(t)$; where $P_{HVAC}$ is the actual power consumed by HVAC systems, and $\mu_{HVAC}$ is a constant indicating the performance of an HVAC system. One objective can be to minimize a cost function of $P_{HVAC}(t)$ while maintaining occupants' comfort. The dynamics of building l can be rewritten as follows:

$$\dot{x}_b^{(l)}(t) = A_b^{(l)} x_b^{(l)}(t) + B_{u_b}^{(l)} u_b^{(l)}(t) + B_{w_b}^{(l)} w_b^{(l)}(t), \quad (1)$$

where $x_b^{(l)} = [T_{wall} \; T_{zone}]_l^T$ is the state of building l; $u_b^{(l)} = [P_{HVAC}]_l$ is the control input variable; $w_b^{(l)} = [T_{amb} \; \dot{Q}_{sol} \; \dot{Q}_{int}]_l^T$ is a random uncontrollable input. Various methods have been developed to provide an estimate of $w_b^{(l)}$, denoted by $\hat{w}_b^{(l)}$, for each building. Clusters of buildings can be considered with each cluster being connected to a power grid node. The impact of buildings' contribution to frequency regulation and overall energy consumption costs can be determined by analyzing the dynamics of building clusters.

$$\dot{x}_b(t) = A_b x_b(t) + B_{u_b} u_b(t) + B_{w_b} w_b(t), \quad (2)$$

where $n_b$ is the total number of buildings in the network; $x_b \in \mathbb{R}^{2n_b}$, $u_b \in \mathbb{R}^{n_b}$, and $w_b \in \mathbb{R}^{3n_b}$. In the absence of communication between buildings, the state-space matrices $A_b$, $B_{u_b}$, and $B_{w_b}$ will all be diagonal matrices.

The dynamics of building integrated power network can be presented and the variables involved in the BtG integration framework can be defined. In addition, the connection of the BtG integration model with the optimal power flow (OPF) is discussed herein.

DAE Dynamics of a Power Network with Building Loads.

Let $B = \{1, \ldots, n\}$ and $\mathcal{G} = \{1, \ldots, n_g\}$ $B = \{1, \ldots, n\}$ and $\mathcal{G} = \{1, \ldots, n_g\}$ denote the sets of buses and generators in a power network. Also, let $N_k$ be the neighborhood set of adjacent nodes connected to the $k^{th}$ bus. Generators are indexed by $m \in \mathcal{G}$. The mechanical input power to the $m^{th}$ generator is denoted by $P_m$. Define generator-to-node and building-to-node incidence matrices $\Gamma \in \mathbb{R}^{n \times n_g}$ and $\Pi \in \mathbb{R}^{n \times n_b}$ $\Gamma \in \mathbb{R}^{n \times n_g}$ and $\Pi \in \mathbb{R}^{n \times n_b}$ with entries given by:

$$\gamma_{k,m} = \begin{cases} 1 \\ 0 \end{cases} \text{ if the } m^{th} \text{ generator is connected to bus } k \text{ otherwise,}$$

$$\pi_{k,l} = \begin{cases} 1 \\ 0 \end{cases} \text{ if the } k^{th} \text{ bus is connected to building } l \text{ otherwise.}$$

The transients of the $k^{th}$ bus in a power network can be modeled by the swing equation which relates the rotor angle with the angular velocity and angular acceleration $\ddot{\delta}$. Define $M_k$ and $D_k$ as the inertia and damping coefficients of the generator located $k^{th}$ bus; if the $k^{th}$ bus does not have a generator, then $M_k = D_k = 0$. The swing equation for the $k^{th}$ bus ($\forall k \in B$) can be written as:

$$M_k \ddot{\delta}_k + D_k \dot{\delta}_k = \gamma_{k,m} P_m - P_{L_k} - \Sigma_{j \in N_k} b_{kj} \sin(\delta_k - \delta_j). \quad (3)$$

The load at bus k, $P_{LK}(t)$, can be written as follows: $P_{LK}(t) = D_k' \dot{\delta}_k(t) + P_{BL_k}(t) + \Sigma_{l=1}^{n_b} \pi_{k,l} P_{bldg}^{(l)}(t)$; where $D_k' \dot{\delta}_k$ denotes the frequency-sensitive uncontrollable load at bus k, $P_{BL_k}(t)$ denotes the frequency-insensitive uncontrollable base-loads; $\Sigma_l \pi_{k,l} P_{bldg}^{(l)}(t)$ defines the load from buildings indexed by l and attached to bus k that are participating in regulation, defined as $P_{bldg}^{(l)}(t) = P_{HVAC}^{(l)}(t) + P_{misc}^{(l)}(t)$; where $l \in \{1, 2, \ldots, n_b\}$ is index of buildings. $P_{HVAC}^{(l)}(t)$ denotes the portion of controllable power consumption of building l, while $P_{misc}^{(l)}(t)$ represents the uncontrollable miscellaneous power consumption of building l such as lighting, computers, equipment, elevators—amounting to a building's base-load. We can now rewrite (3) as:

$$M_k \ddot{\delta}_k(t) + D_k \dot{\delta}_k(t) = \gamma_{k,m} P_m(t) - \sum_{j \in N_k} b_{kj} \sin(\delta_k(t) - \delta_t(t)) - \quad (4)$$
$$D_k' \dot{\delta}_k(t) - P_{BL_k}(t) - \sum_{l=1}^{n_b} \pi_{k,l} \left( P_{HVAC}^{(l)}(t) + P_{misc}^{(l)}(t) \right).$$

In (4), $P_m(t)$ for generator bus m can be written as $P_m(t) = \overline{P}_m + \Delta P_m(t)$, where $\overline{P}_m$ can be a solution of an optimal power flow problem—computed every 15 minutes—and $\Delta P_m(t)$ can be the deviation from the set point $P_m$, which can be provided by the proposed BtG integration framework. Let $\dot{\delta}_k = \omega_k$, where $\omega_k = \omega_k^{true} - \omega_0$, where $\omega_k^{true}$ is the actual frequency of the $k^{th}$ bus ($\omega_0$ is the synchronous frequency, e.g., $2\pi 60$ rad/sec in North America). The resulting state-space model is a nonlinear descriptor system (or a DAE), and can be written as:

$$E_g \dot{x}_g(t) = A_g x_g(t) + \Phi(\delta(t)) + A_{u_b} u_b(t) + B_{u_g} u_g(t) + B_{w_g} w_g(t), \quad (5)$$

where $x_g(t) = [(\delta_1 \ldots \delta_n \; \omega_1 \ldots \omega_n]^T = [\delta^T(t) \omega^T(t)]^T$ is the state of the grid; $\Phi(\delta(t))$ is the vectorized nonlinear power flow equations in (4); $u_b(t) = [P_{HVAC}^{(1)} \ldots P_{HVAC}^{(n_b)}]^T$ is the control input vector of the buildings, as defined in (2), and $u_g(t) = \overline{u}_b + \Delta u_g(t) = [\overline{P}_1 + \Delta P_1(t) \ldots \overline{P}_{n_g} + \Delta P_{n_g}(t)]^T$ is the power network's control variable; $w_g(t) = [w_{BL}^T, w_{misc}^T]^T = [P_{BL_1} \ldots P_{BL_n}, P_{misc}^{(1)} \ldots P_{misc}^{(n_b)}]^T$ is a random vector collecting the nodal base loads and miscellaneous building loads. Load forecasting is a very mature area; in the sequel, the forecast of $w_g(t)$, denoted by $\hat{w}_g(t)$, is assumed to be available.

Higher Order Grid Models—Although the second order dynamics of the power network can be presented in (5), a higher order representation is possible. However, since one focus is on the BtG integration, a more advanced power network model can be substituted with a simpler one for conciseness and computational tractability.

Recall that $u_g(t) = \overline{u}_b + \Delta u_g(t)$, where $\overline{u}_g$ is the vector containing the set points for the generators, and $\Delta u_g(t)$ is the real-time deviation from these set points that automatically drives the power grid to stability after load deviations or disturbances. In some embodiments, the set points are computed every 5-15 minutes through solving economic dispatch or OPF routines. A linearized OPF (LOPF) problem can be written as:

$$\text{LOPF:} \quad \underset{\overline{u}_g = \{\overline{u}_{gi}\}_{i=1}^{n_g}}{\text{minimize}} \quad J(\overline{u}_g) = \overline{u}_g^T J_{u_g} \overline{u}_g + b_{u_g}^T \overline{u}_g + c_{u_g} \quad (6a)$$

$$\text{subject to } \overline{u}_g^{min} \leq \overline{u}_g \leq \overline{u}_g^{max} \quad (6b)$$

$$(\Gamma \overline{u}_g - \Pi(u_b + \hat{w}_{misc}) - \hat{w}_{BL})^T 1_n = 0 \quad (6c)$$

$$|L_{ptdf}(\Gamma \overline{u}_g - \Pi(u_b + \hat{w}_{misc}) - \hat{w}_{BL})| \leq F^{max}, \quad (6d)$$

where $J(\overline{u}_g)$ is a convex cost function that represents the generators' cost curves; $u_b$ and $\hat{w}_{misc}^{\hat{w}_{misc}}$ are vectors of building HVAC and (forecasted) miscellaneous loads; $\hat{w}_{BL}^{\hat{w}_{BL}}$ is the vector of (forecasted) base loads; vector $\Gamma \overline{u}_g - \Pi(u_b + \hat{w}_{misc}) - \hat{w}_{BL}$ represents the nodal power injections; $1_n \in \mathbb{R}^n$ is a vector of all ones; $F^{max} \in \mathbb{R}^{nl}$ 1 is the vector containing the thermal limits for real power flow on the nl branches of the network; and $L_{ptdf} \in \mathbb{R}^{nl \times n}$ is a matrix of power transfer distribution factors. The constraints can represent the safety upper and lower bounds on the generator's active power while ensuring the supply-demand balance and the satisfaction of line flow limits.

Therefore, the dynamics of the buildings-integrated power network can be formulated. In (5), the presence of $u_b(t)$ exemplifies the control potential that buildings have on power system operation and control, and hence the integration advocated in this paper. In this section, we investigate the discrepancies in time-scales between the building (2) and power network dynamics (5) and discuss a formulation of the joint optimal control problem that addresses the time-scale discrepancies, while seamlessly incorporating objectives and constraints from the power grid and building clusters.

Figure 2:
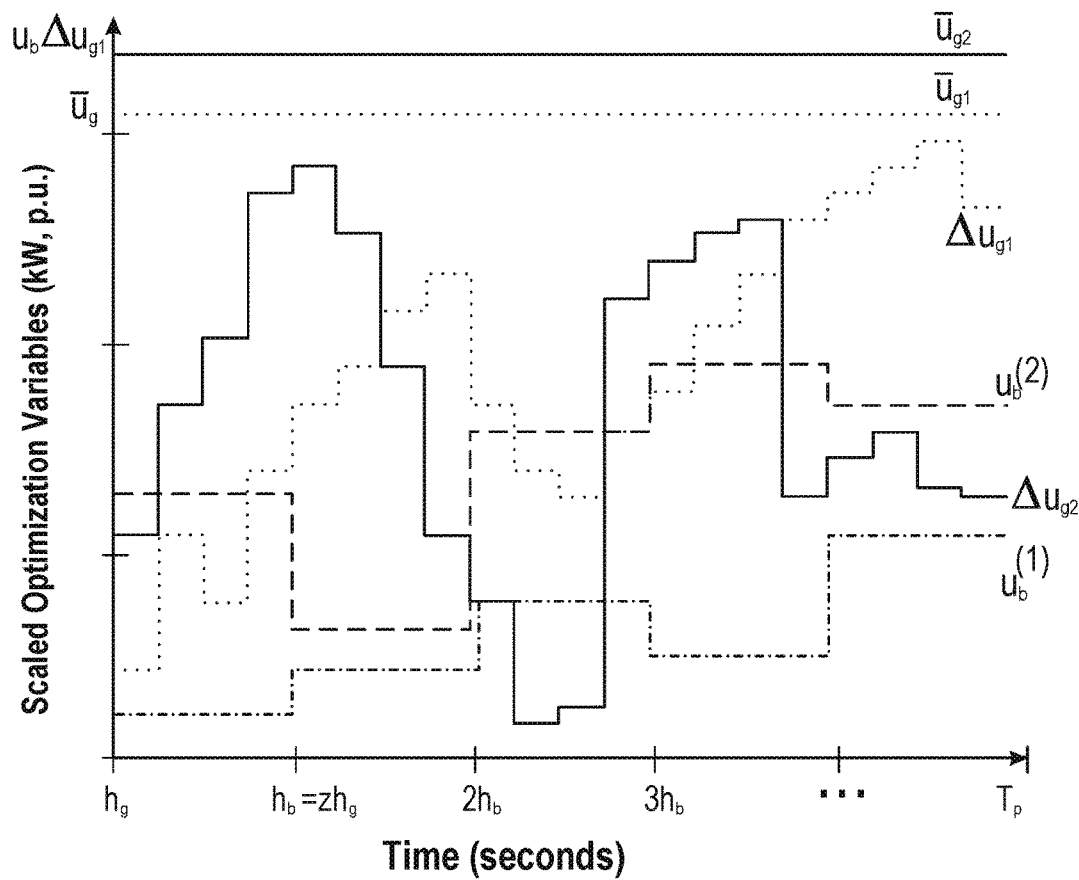
FIG. 2 illustrates hypothetical solutions to a join optimal control program with multiple time-scales for a buildings-integrated power network according to various example embodiments.

The formulated dynamics discussed herein can operate in two different time-scales. While grid regulation problems and mechanical input power variations are often in seconds, the building dynamics and controls can be much slower. For example, temperatures in buildings change slowly in comparison with frequencies and voltages in power networks. To overcome this limitation, one can assume local optimal control laws for buildings are computed at different time-steps than local optimal control laws for generators. This approach reflects the physical realities for these systems, and this consideration can be imposed via constraints in the optimal control problem, whose construction can be an objective. Since buildings possess slower dynamic behavior, the controls of buildings can be fixed for the faster time-scale of the power network. FIG. 2 illustrates a graph conveying this idea according to various embodiments of the present disclosure. Consider a hypothetical network with two generators and two commercial buildings, making up a total of six control variables ($u_b$, $\overline{u}_b$, $\Delta u_g$). The optimal deviations from the generators' controls fluctuate at a higher rate than the building controls, whereas the set-points for generators change once for a single prediction horizon as shown in FIG. 2. Given this integration scheme, and since hard constraints can be imposed on the grid and building dynamics, model predictive control (MPC) becomes the only viable solution to solve the joint optimal control problem.

Another challenge facing BtG integration is the presence of algebraic equations in (5) emerging from power flows of load nodes. Here, a simple, yet high-fidelity discretization routine for two dynamical systems with different time-scales and dynamic algebraic constraints are presented. First, an assumption can be made that sampling times for the power grid [cf. (5)] and building [cf. (2)] dynamics are respectively $h_g$ and $h_b$; note that $h_b \gg h_g$. The discretization utilize herein can be based on Gear's method—a backward differentiation routine—for DAE (descriptor) systems. This singular descriptor system discretization can be written as follows:

$$x_g(k_g h_g) = f_g(x_g, u_g, u_b, w_g) = \overline{A}_g \sum_{i=1}^{s} \alpha_i E_g x_g(h_g(k_g - i)) + \quad (7)$$
$$B_0(A_{u_b} u_b(k_g h_g) + B_{u_g} u_g(k_g h_g) + B_{w_g} w_g(k_g h_g)),$$

where $\overline{A}_g = (E_g - h_g \beta_0 A_g)^{-1}$, $B_0 = h_g \beta_0 \overline{A}_g$, $\beta_0 = (\Sigma_{i=1}^{s} 1/i)^{-1}$, and $\alpha_i = (-1)^{i+1} \beta_0 \Sigma_{j=i}^{s} j^{-1}(\binom{j}{i})$; $k_g$ is the time-step for the grid dynamics. This method includes a set of s initial conditions. Similarly, the discrete form of (2) can be written as follows:

$$x_b(k_b h_b) = f_b(x_b, u_b, w_b) = \quad (8)$$
$$\overline{A}_b \sum_{i=1}^{s} \alpha_i x_b(h_b(k_b - i)) + B_1(B_{u_b} u_b(k_b h_b) + B_{w_b} w_b(k_b h_b)),$$

where $k_b$ is time-step for buildings' dynamic operation. Gear's discretization amounts to a backward Euler-like implicit method. The principal merit of implicit methods is that they are typically more stable for solving systems with a larger step size h, while still performing well for systems with faster time-constants. A simple simulation can show that Gear's method returns accurate state-solution for the building and grid dynamics Convergence of Gear's Method—The states of the discretized descriptor system in (7) and (8) converge to the actual ones in finite time-steps, even if the s-initial conditions are arbitrarily chosen.

Joint Optimal Control Problem: BtG-GMPC—The joint optimal control problem, Building-to-Grid Gear MPC (BtG-GMPC), is formulated as in (9). The variables, cost function, and constraints of BtG-GMPC are as follows:

$T_p$ is the prediction horizon and the formulation above only shows the MPC for one prediction horizon; t is the initial starting point of the MPC.

$U_b = \{u_b(t+h_b), u_b(t+2h_b), \ldots, u_b(t+T_p)\}$, $\Delta U_g = \{\Delta u_g(t+h_g), \Delta u_g(t+2h_g), \ldots, \Delta u_g(t+T_p)\}$, and $\overline{u}_g$ are the three sets of optimization variables that we defined previously. Also, the cost function is defined as:

$$f(\Delta U_g, \overline{u}_g, U_b) = J(\overline{u}_g) + \frac{h_b}{T_p} \sum_{k_b=1}^{T_p/h_b} [c_b^T(t+k_b h_b) u_b(t+k_b h_b)] +$$
$$\frac{h_g}{T_p} \sum_{k_g=1}^{T_p/h_g} [\Delta u_g^T(t+k_g h_g) R \Delta u_g(t+k_g h_g) + x_g^T(t+k_g h_g) Q x_g(t+k_g h_g)]$$

which adds the LOPF costs to the average of the building and grid control costs: $J(\overline{u}_g)$ is the LOPF cost function (6a) and $c_b(t+k_b h_b)$ is a time-varying vector representing the cost of electricity at time $t+k_b h_b$. $Q \in \mathbb{R}^{2n \times 2n}$ and $R \in \mathbb{R}^{n_g \times n_g}$ are positive semi-definite penalty matrices for the grid dynamics, with penalization to the deviations in the frequencies of the generators and the magnitude of the control actions.

Constraints (9b)-(9d) depict the dynamics of the building-integrated power grid, as well as lower and upper bounds on the states and inouts of the grid states and controls. Note that $x_b(t+k_bh_b)=f_g(x_g, u_g, u_b, \hat{w}_g|t,s) \triangleq \bar{A}_b\Sigma_{i=1}^s \alpha_i E_g \times x_g(t+h_g(k_g-i))+B_0(A_{u_b}u_b(t+|k_gh_g)+B_{u_g}u_g(t+k_gh_g)+B_{w_g}\hat{w}_g(t+k_gh_g))$,
where s corresponds to the order of Gear's method.

Constrains (9e)-(9g) represent the building cluster dynamics and the bounds on the states and inputs of the individual buildings, while constraint (9h) imposes the constraints of the LOPF as discussed in the previous section.

The final constraint (9i) represents the idea of the time-scales integration, as illustrated in FIG. 2, whereby the building control variables (7) are kept constant between two consecutive building instances. Since $h_b > h_g$, we assume that between two consecutive building sampling instances (i.e., $k_bh_b$) are all constant variables to be found. Hence, for all $\forall k_gh_g \in [k_bh_b, (k_b+1)h_b], u_b(k_bh_b)=u_b(k_gh_g)=\bar{u}_b$.

*BtG-GMPC:*

$$\underset{U_b, \Delta U_g, \bar{u}_g}{\text{minimize}} \quad f(\Delta U_g, \bar{u}_g, U_b) \quad (9a)$$

subject $x_g(t+k_gh_g) = f_g(x_g, u_g, u_b, \hat{w}_g|t, s)$ (9b)

$\Delta u_g^{min} \leq \Delta U_g(t+k_gh_g) \leq \Delta u_g^{max}$ (9c)

$x_g^{min} \leq x_g(t+k_gh_g) \leq x_g^{max}$ (9d)

$\forall k_g \in \{1, ..., T_p/h_p\}$ $x_b(t+k_bh_b) = f_b(x_b, u_b, \hat{w}_g|t, s)$ (9e)

$u_b^{min} \leq u_b(t+k_bh_b) \leq u_b^{max}$ (9f)

$x_b^{min} \leq x_b(t+k_bh_b) \leq x_b^{max}$ (9g)

$\forall k_b \in \{1, ..., T_p/h_p\}$ (6b), (6d) (9h)

$u_b(t+k_gh_g) = \bar{u}_b = u_b(t+k_bh_b)$ (9i)

$\forall k_gh_g \in [k_bh_b, (k_b+1)h_b)$.

Algorithm 1 illustrates a routine that implements BtG-GMPC's rolling horizon window along with the integration of the LOPF problem. The proposed algorithm solution mimics the idea depicted in FIG. 2. Given the BtG-GMPC parameters (including the first s-initial steps of the discretized dynamics), the algorithm computes the optimal solutions to the LOPF problem and the joint MPC. For simplicity, the prediction horizon $T_p$ can be assumed to be equivalent to the time-scale in which the optimal dispatch is solved, i.e., 5 to 15 minutes. An assumption can also be made that $h_g < h_b < T_p \ll T_{final}$ and $h_b/h_g$, $T_p/h_b$, and $T_p/h_g$ are all positive integers. The algorithm can start by finding the solution to the generator's operating points $\bar{u}_g$ for any multiple of the prediction horizon $T_p$, as well as the deviation from this set point $\Delta u_g(t)$ and $u_b(t)$ up until the next planning horizon, and so on. As in classical MPC routines, only the first instance of the optimal control trajectory is applied, while the rest are discarded. Note that the BtG-GMPC with LOPF is only solved for when t (the counter) is a multiple of $T_p$. If t is not a multiple of $T_p$, but a multiple of the building's sampling time $h_b$, the building and grid controls are computed. The gap between the two time-scales can be captured: where the building and grid controls are applied, the building controls are kept constant from the previous optimal computations, while grid controls are computed in the meantime for every grid sampling time.

---

Algorithm 1 Online BtG-GMPC and LOPF Integration

1: input: BtG-GMPC forecasts and parameters, $x_b(-(s-1)h_b$ :
      $h_b$ : 0), $x_g(-(s-1)h_g$ : $h_g$ : 0), $T_p$, $T_{final}$
2: output: $\{u^*_g, \Delta u^*_g, u^*_b\}$ $\forall t \in [0, T_{final}]$
3: while $t < T_{final}$
4:   if $t = \kappa T_p$ (multiple of $T_p$, i.e., $t = 0$, $T_p$, $2T_p$,...)
5:     solve BtG-GMPC (9) for $U^*_b$, $\Delta U^*_g$, $\bar{u}^*_g$
6:     apply $\bar{u}^*_g$ $\forall t \in [\kappa T_p, (\kappa + 1)T_p]$
7:     apply $U^*_b(1)$ $\forall t \in [t, t + h_b]$
8:     apply $\Delta U^*_g(1)$ $\forall t \in [t, t + h_g]$
9:     discard $U^*_b(2$ : end), $\Delta U^*_g(2$ : end)
10:  else if $(t = \kappa_1h_g) \wedge (t \neq \kappa_2T_p) \wedge (t \neq \kappa_3h_b)$
11:    solve (9) without $\bar{u}_g$, $U_b$, while eliminating constraints (9e)-(9i) where $U_b$, $\bar{u}_g$ are the optimal constant values from the previous/subsequent steps
12:    apply $\Delta U^*_g(1)$ $\forall t \in [t, t + h_g]$
13:    discard $\Delta U^*_g(2$ : end)
14:  else if $(t = \kappa_1h_b) \wedge (t \neq \kappa_2T_p)$
15:    solve (9) without $\bar{u}_g$, (9h), and $J(\bar{u}_g)$
16:    apply $U^*_b(1)$ $\forall t \in [t, t + h_b]$
17:    apply $\Delta U^*_g(1)$ $\forall t \in [t, t + h_g]$
18:    discard $U^*_b(2$ : end), $\Delta U^*_g(2$ : end)
19:  end if
20:  $t \leftarrow t + h_g$
21: end while

---

Problem (9) is a quadratic program. This optimization routine is tractable. In some embodiments, the optimization routine can be solved by SeDuMi, MOSEK, MATLAB's QuadProg, or other solvers. BtG-GMPC optimization can be applied online as predictions for the uncontrollable inputs might not be available for times greater than the prediction horizon $T_p$. Fast online MPC algorithms for quadratic programs can be used, and can be immediately applied to the formulation.

Figure 3:
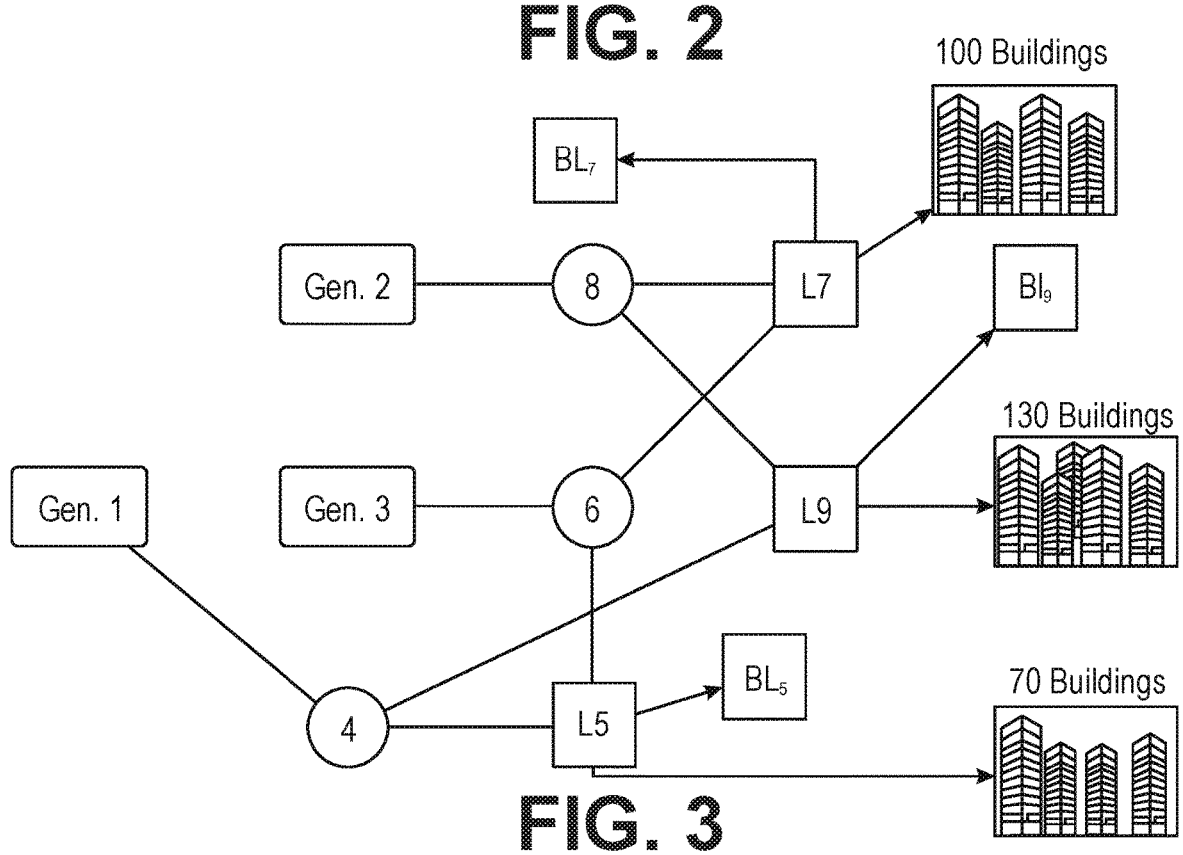
FIG. 3 illustrates a topology of a power grid with 300 buildings according to various example embodiments.

With reference to FIG. 3, an analysis was performed on a power network with three generators and three load nodes with a total of 300 buildings—divided into three clusters of 70, 100 & 130 buildings at nodes L5, L7, and L9. The simulations were performed for a 24 time-period ($T_{final}$=24 hours). The parameters, exact constraints, weather data, electricity prices, and other details of the problem are carefully chosen to reflect reasonable conditions. The numerical results for the BtG-GMPC and Algorithm 1 are presented in comparison with solving the optimal control of buildings and power grids separately. In addition, the results of BtG-GMPC can be with bang-bang control of HVAC systems. The three scenarios can use the same parameters, initial conditions, constraints, and costs.

Figure 4:
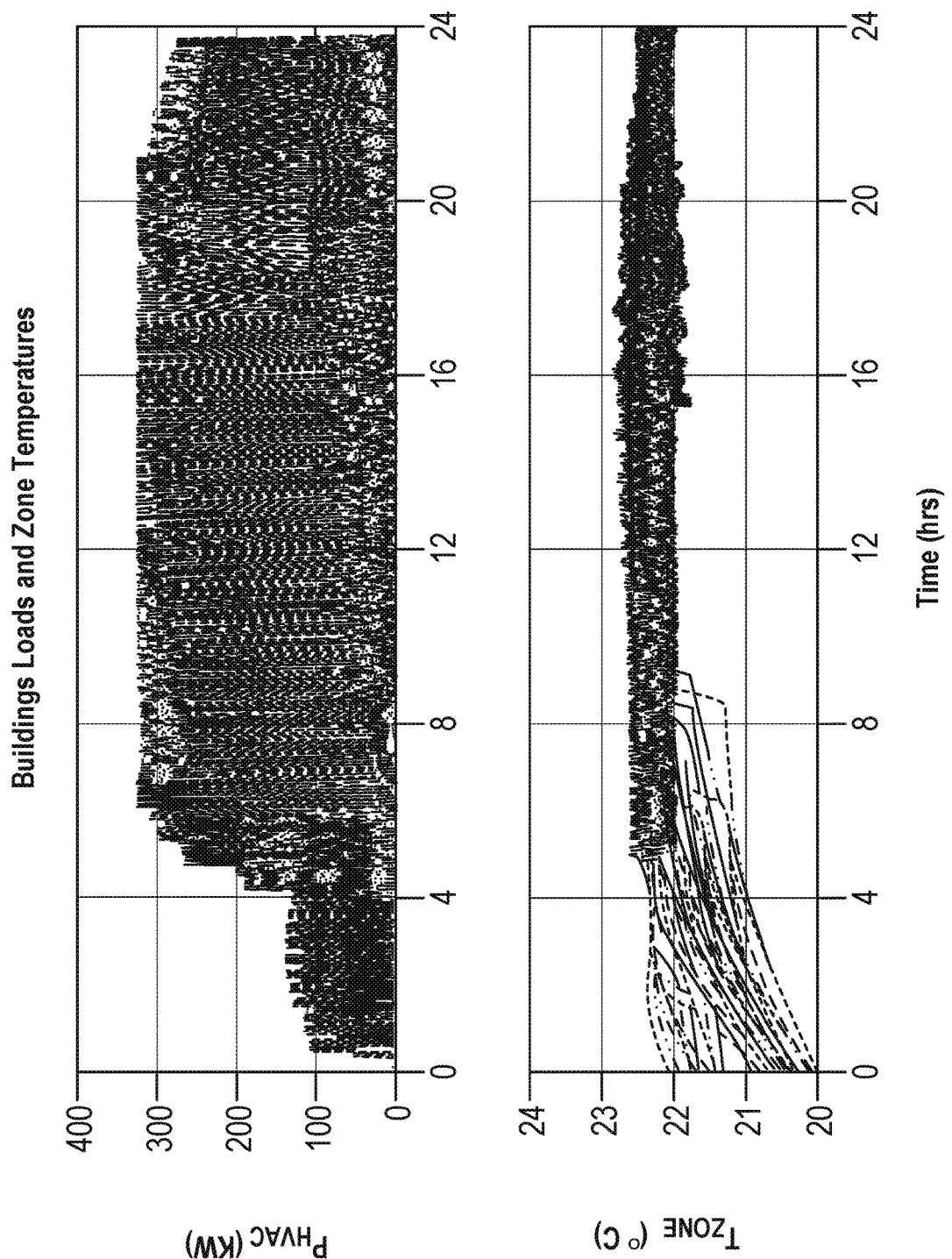
FIG. 4 illustrates the bang-bang control PHVAC loads for 300 buildings and corresponding zone temperatures according to various example embodiments.
Figure 5:
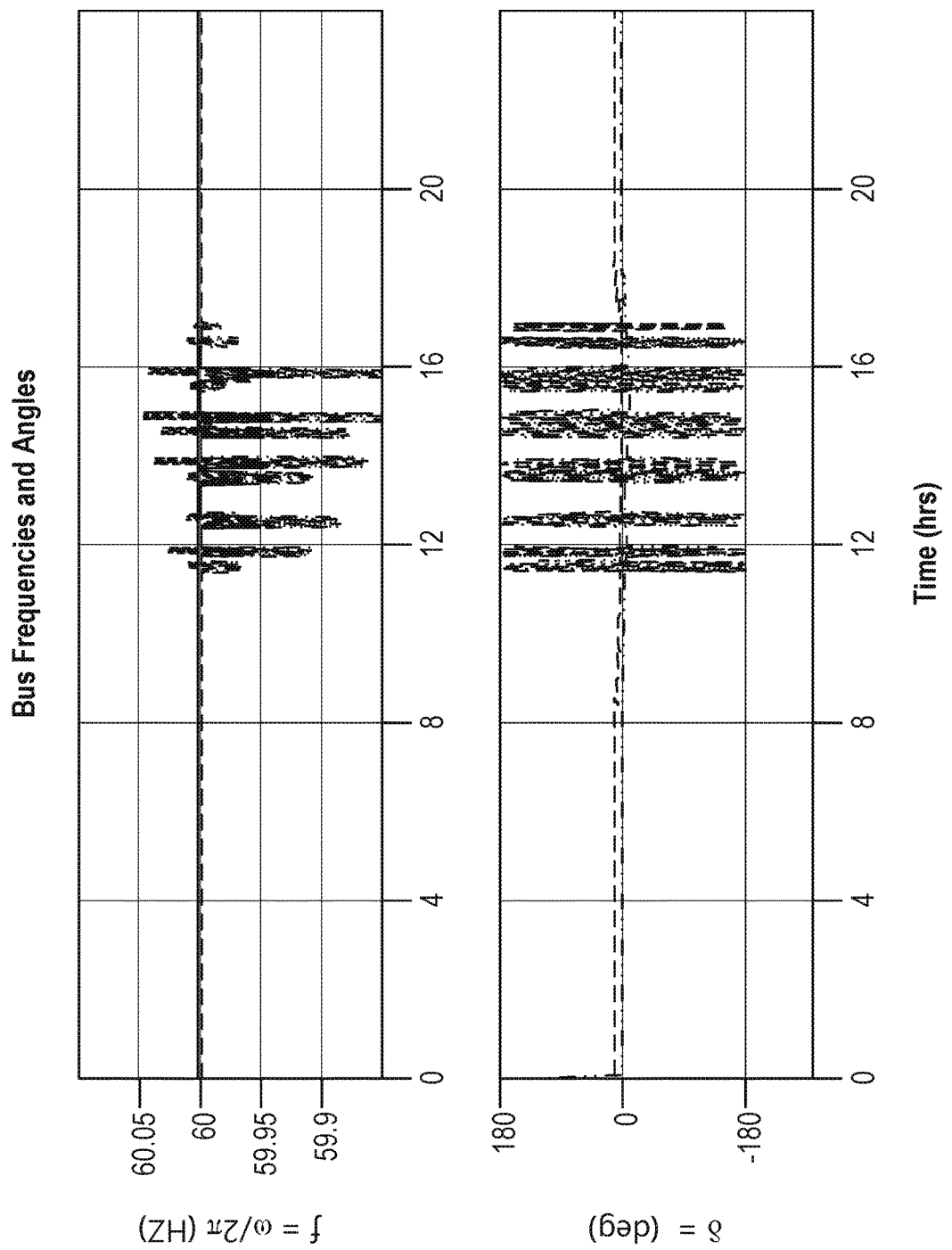
FIG. 5 illustrates results showing a state of a power network (bus frequencies and angles) according to various example embodiments.

According to a first example scenario (Scenario I), the grid control problem receives a schedule of the building HVAC and miscellaneous loads, where the HVAC loads are independently computed via bang-bang control. Bang-bang control is the simplest type and most common type of HVAC control where the controller follows a strict temperature set point (e.g., 22.22 degrees C.). The HVAC control system is switched on (or off) as soon as the zone temperature exceeds (or is below) the dead band which is generally + or –0.5 C. The resulting HVAC power consumptions and corresponding zone temperatures for the 300 buildings are shown in FIG. 4. The bang-bang building control can maintain the temperature in the aforementioned band. After simulating this case over a period of 24 hours, these bang-bang HVAC inputs are provided to the grid optimal control problem, which is formulated as an MPC based on Gear's method. Specifically, this problem is essentially BtG-GMPC with all the building variables pre-computed as discussed above. FIG. 5 shows the frequency and angle variations for the nine buses of the power network given the bang-bang controls.

Due to the intermittent nature of the HVAC load, the grid frequency experiences significant deviations from its nominal value (60 Hz); see FIG. 5. The frequency variations are more prominent at durations when the total load is at peak values. The total costs for Scenario I are provided in Table I.

Figure 6:
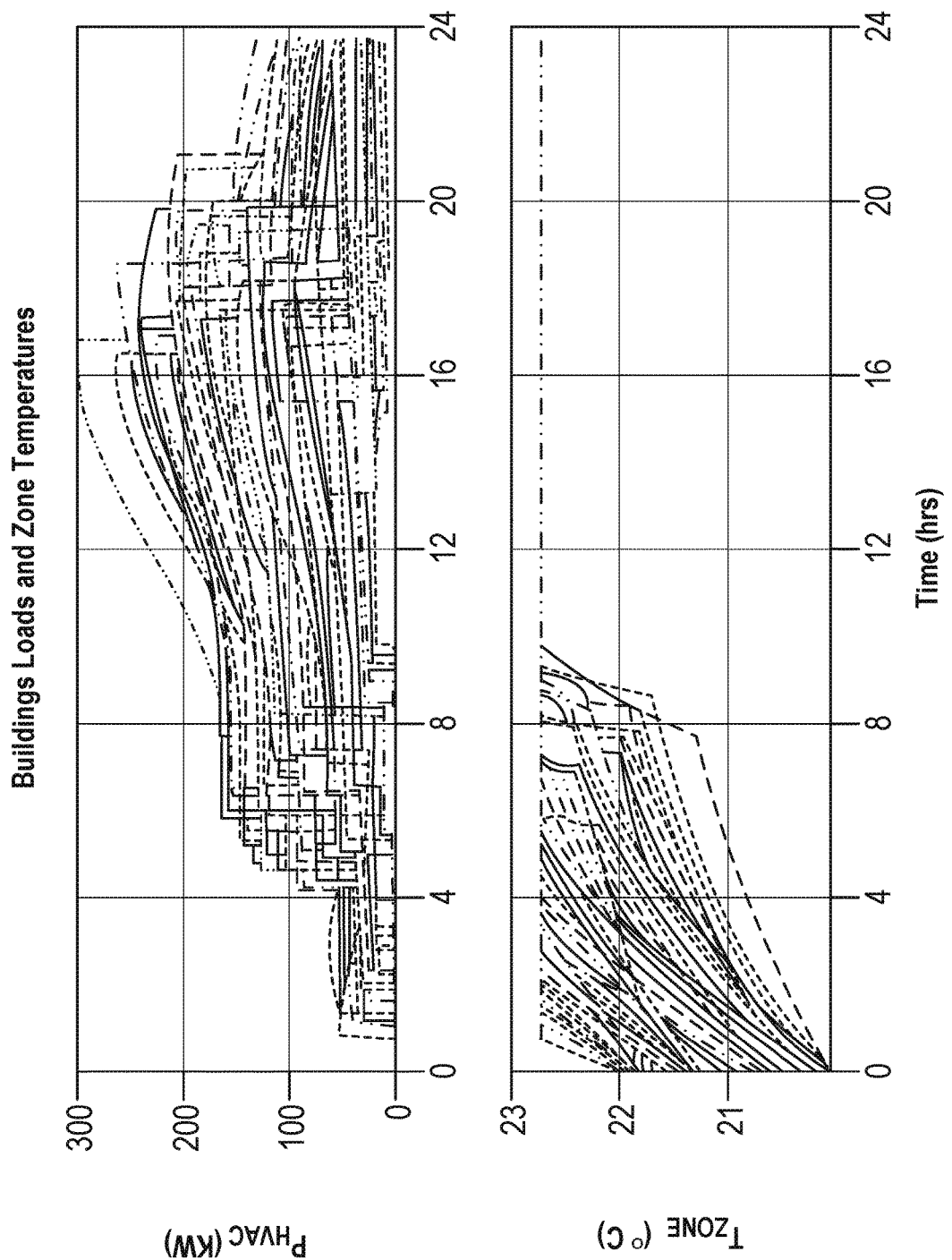
FIG. 6 illustrates building performance results showing MPC-based $P_{HVAC}$ loads for 300 buildings and corresponding zone temperatures when solving the optimization problem of buildings and grid separately according to various example embodiments.
Figure 7:
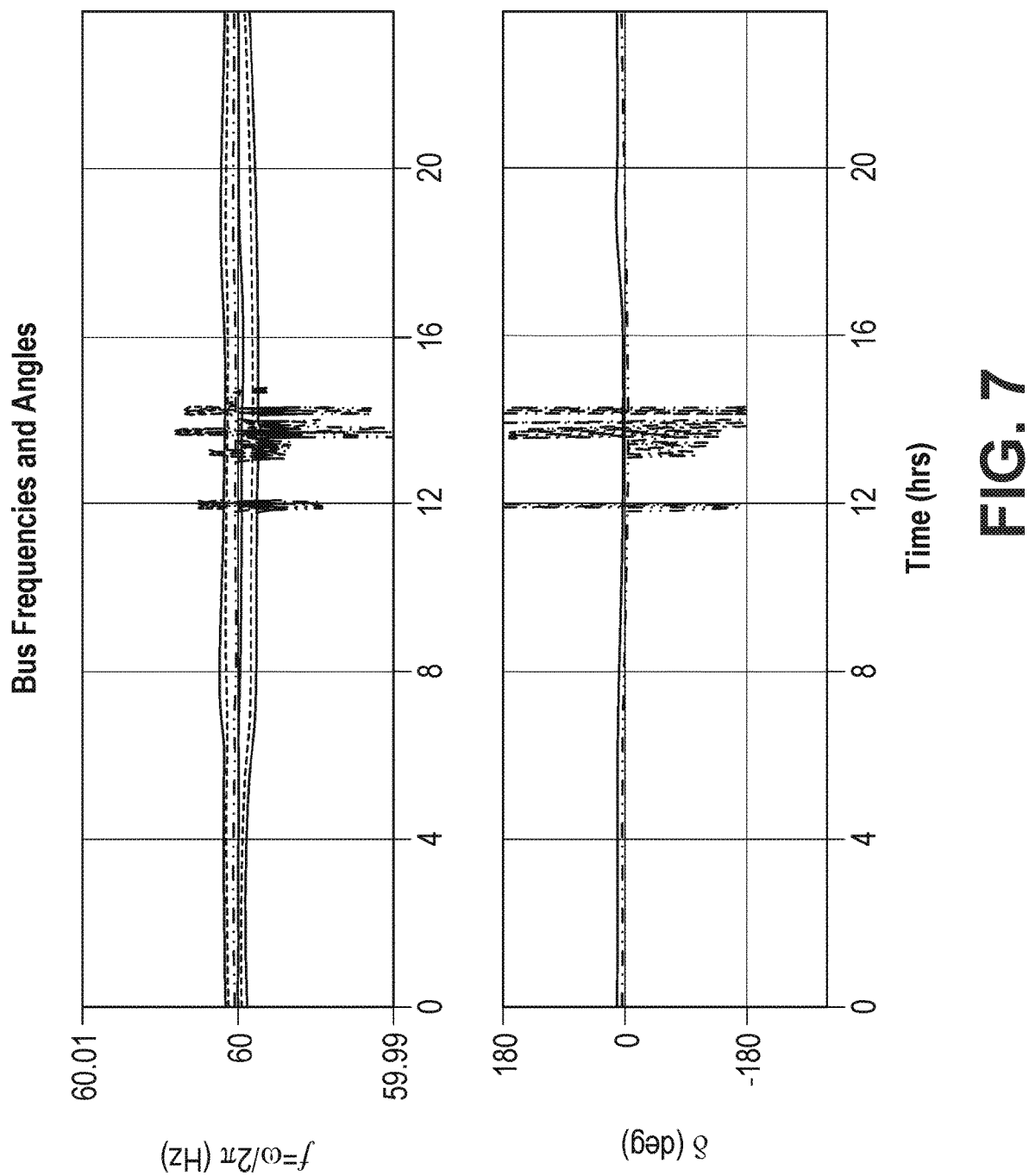
FIG. 7 illustrates grid performance results showing states of a power network where transients in the states are not alleviated due to the decoupled nature of the two optimization problems according to various example embodiments.
Figure 8:
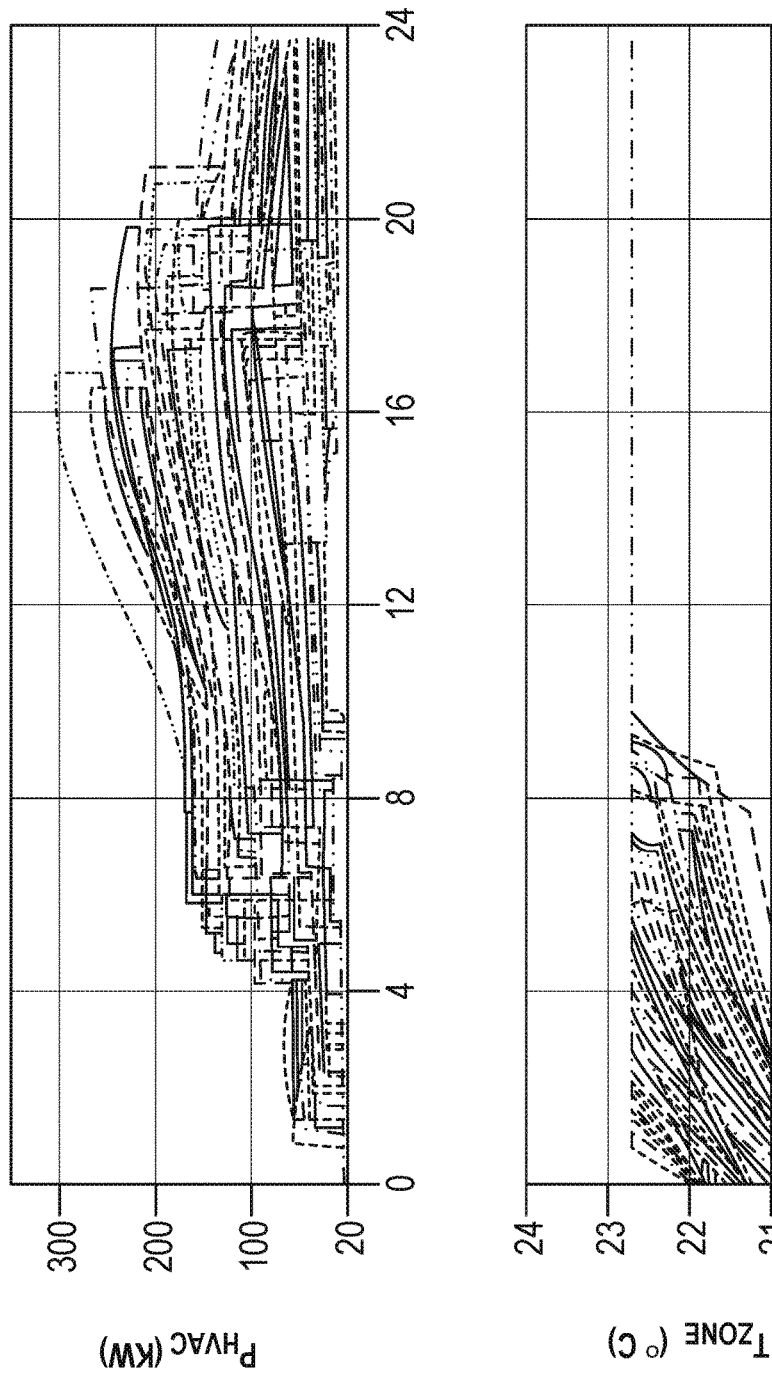
FIG. 8 illustrates building performance results with HVAC set points maintaining the temperatures within specified bounds according to various example embodiments.

According to a second example scenario (Scenario II), the MPC problems can be solved for buildings and the power grid separately. First, the building optimal controls can be computed via the same MPC formulated in (9), while eliminating the power grid constraints and variables. The MPC solution for the building's HVAC loads can then be fed into a grid-only MPC. This scenario is useful in the sense that grid operators can model the building's load via a classical building MPC model. The optimal HVAC loads for 300 buildings are depicted in FIG. 6. The simulation results of this case show an improvement in the HVAC power consumption of buildings. However, this cannot reduce the transients observed in the grid's frequency variations as shown in FIG. 7. This paves the way for the BtG-GMPC (Scenario III). The total costs for Scenario II are also provided in Table I.

Figure 9:
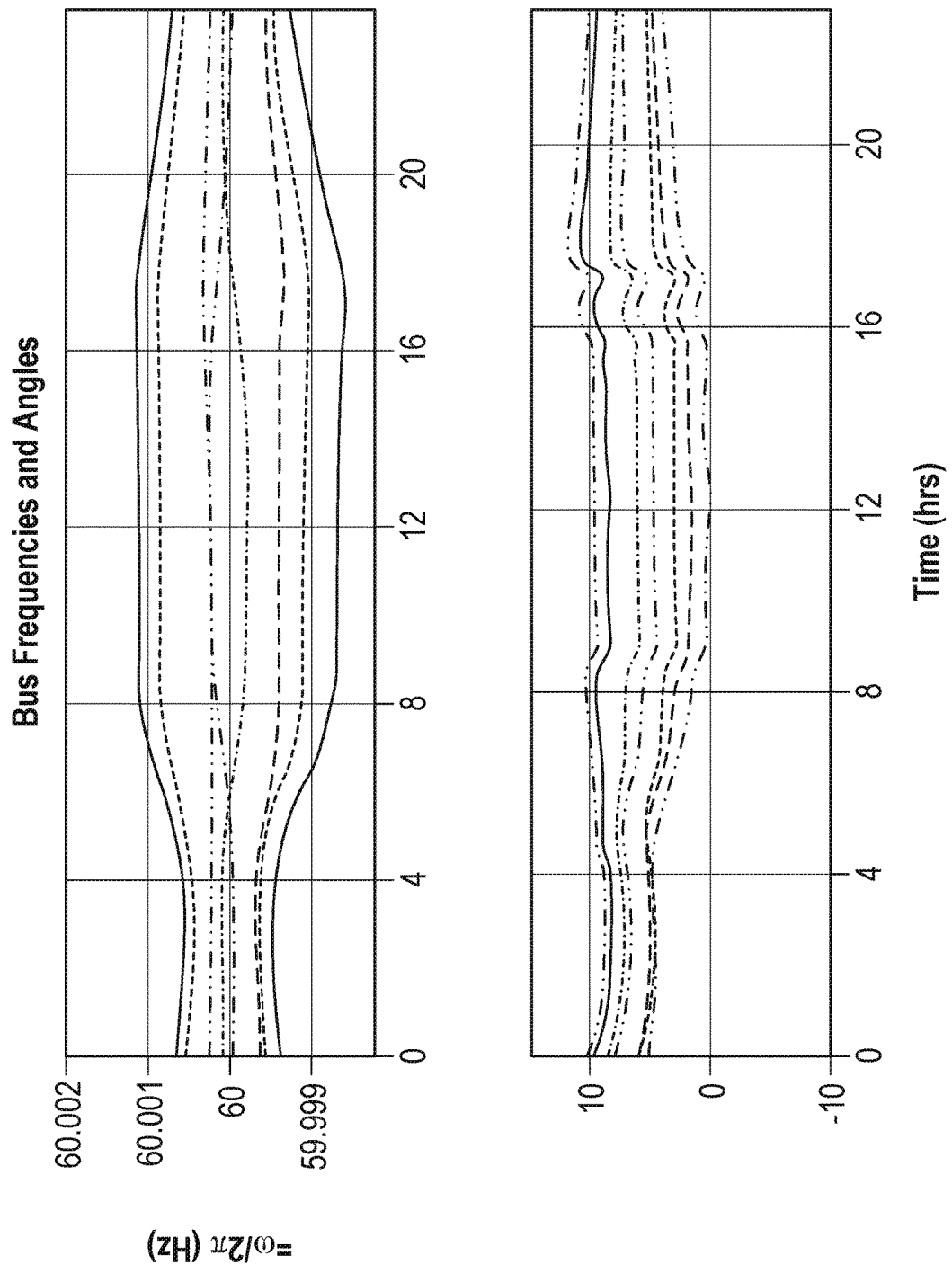
FIG. 9 illustrates grid performance results showing an impact of BtG-GMPC on reducing an angle and frequency of deviations for buses in a network according to various example embodiments.

According to a third example scenario (Scenario III—BtG-GMPC), the proposed algorithm and the corresponding optimization problem (9) can be simulated. The BtG-GMPC results show significant improvement in grid's frequency deviations and the overall costs as shown in FIG. 9 and Table I. The frequency variations can be dramatically lower in comparison with the previous two scenarios. Also, there can be a significant reduction in the overall cost of operation. These results show around 20.2% reduction in total cost with BtG-GMPC as compared to the first two scenarios. Also, the grid's frequency deviations can be reduced by a very large extent, consequently reducing the cost of grid operation by 58%.

Figure 10:
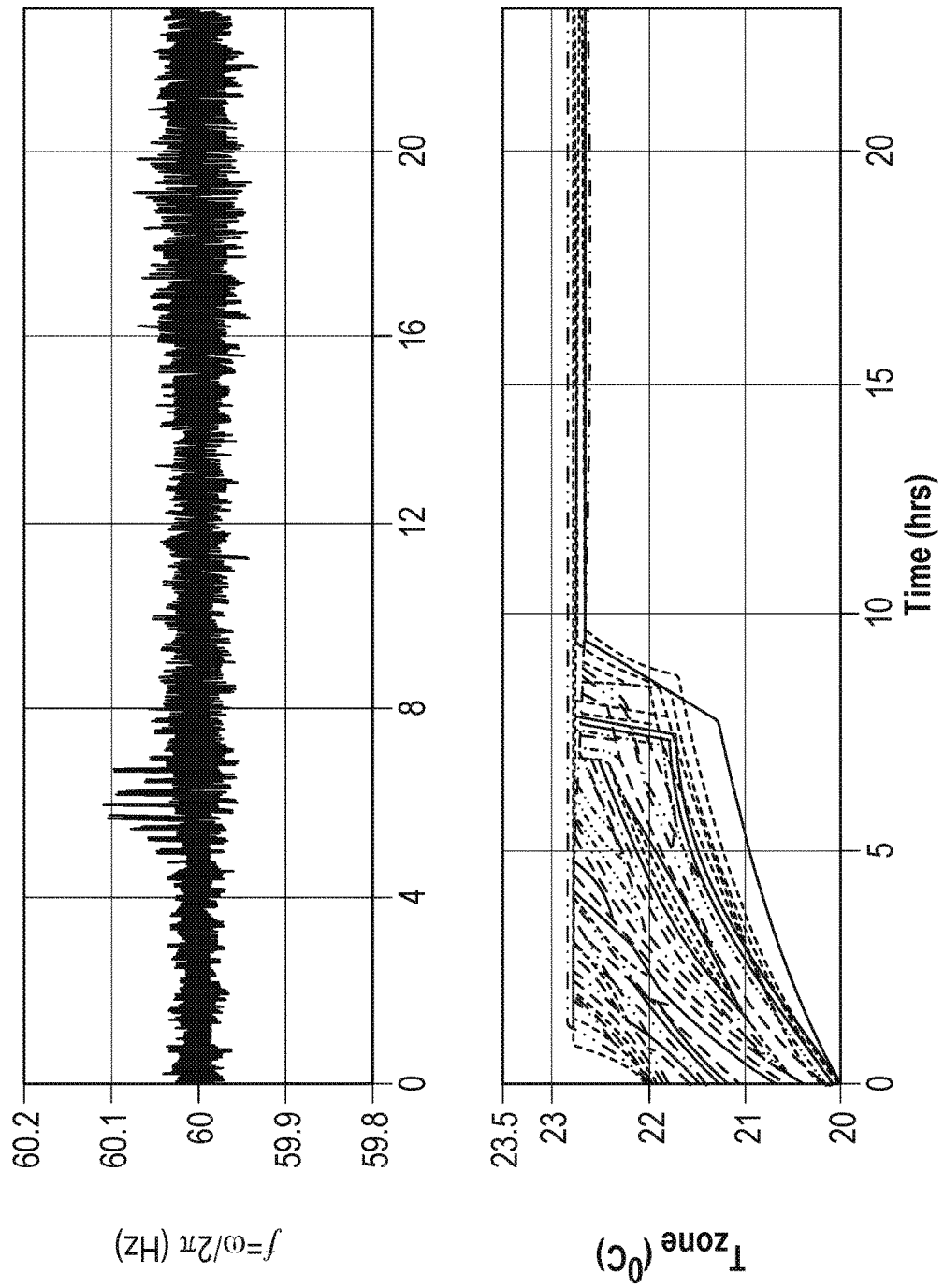
FIG. 10 illustrates performance of BtG-GMPC under forecast uncertainty performed using a nonlinear DAE solver for grid dynamics and ODE solver for the building dynamics according to various example embodiments.

Simulations on Nonlinear DAEs with Forecast Uncertainty: In the previous simulations, FIGS. 4-9 and Table I present the results from the MPC solution using the predicted unknown inputs ($\hat{w}_g$, $\hat{w}_b$) for the linearized power system using Gear's discretization method. A process can be performed including (a) extracting the optimal MPC control variables ($u_b$, $u_g$) for the entire simulation horizon, (b) feeding these inputs to the nonlinear DAE solver for (5) and linear ODE solver for (1), and (c) adding zero-mean Gaussian noise with 2.5% standard deviation from the predicted unknown inputs $\hat{w}_g$ in (5) and $\hat{w}_b$ in (1). One objective can be to validate Gear's discretization method and to assess the performance of the integration framework on the nonlinear continuous-time DAE model for the grid under mismatch between the forecasted and true disturbances. Table II and FIG. 10 can show the outcome of this simulation, where the frequency deviation costs are significantly lower for the BtG-GMPC scenario, in comparison with the first two scenarios for the two cases (with or without noise). FIG. 10 shows that the frequency deviations can be kept within acceptable ranges, and the results in Table II are consistent with the findings in Table I. Note that the MPC scheme can be solved offline given the prediction of the loads and the temperatures, and the resulting controls were used as inputs to the nonlinear DAE solver, which demonstrated the good performance of the developed framework. Disturbances can be added in the MPC while running an online MPC routine, which can further enhance the overall system performance.

With respect to BtG-GMPC assumes the knowledge of various parameters such as building RC constants and generators' cost curves. The following can be considered: (a) a system operator or a large utility can solve BtG-GMPC; (b) commercial building operators contributing to this routine can provide modeling parameters for their buildings; and (c) the global signals computed can be communicated to the now-contributing operators of individual buildings and generators. The added value of this coupling is two-fold. First, the theoretical impact of expanding the feasible space of two separate problems ensures that coupled problem's solution will be superior to the decoupled one. Second, the coupling translates into tangible impact for buildings and the grid.

TABLE II

COST COMPARISON (IN $) OF FREQUENCY DEVIATION AFTER SIMULATING THE NONLINEAR DAES WITH OR WITHOUT NOISE.

| Scenario | Nonlinear DAE (5) | Noisy Nonlinear DAE (5) |
|---|---|---|
| Scenario I | $7.7757 \times 10^7$ | $1.0320 \times 10^8$ |
| Scenario II | $1.0511 \times 10^7$ | $3.8917 \times 10^7$ |
| BtG-GMPC | $8.0155 \times 10^6$ | $3.5278 \times 10^7$ |

A building-to-grid integration dynamic model with optimal power management formulations and different time-scales is disclosed herein. The system considers realistic, high-level building models and frequency-focused grid dynamics, in addition to algebraic equations modeling the nodes without generation. Gear's method is also used as a high fidelity DAE discretization routine that is leveraged to model BtG integration. The impact of BtG-GMPC on reducing overall energy costs and minimizing frequency deviations can be demonstrated.

Figure 11:
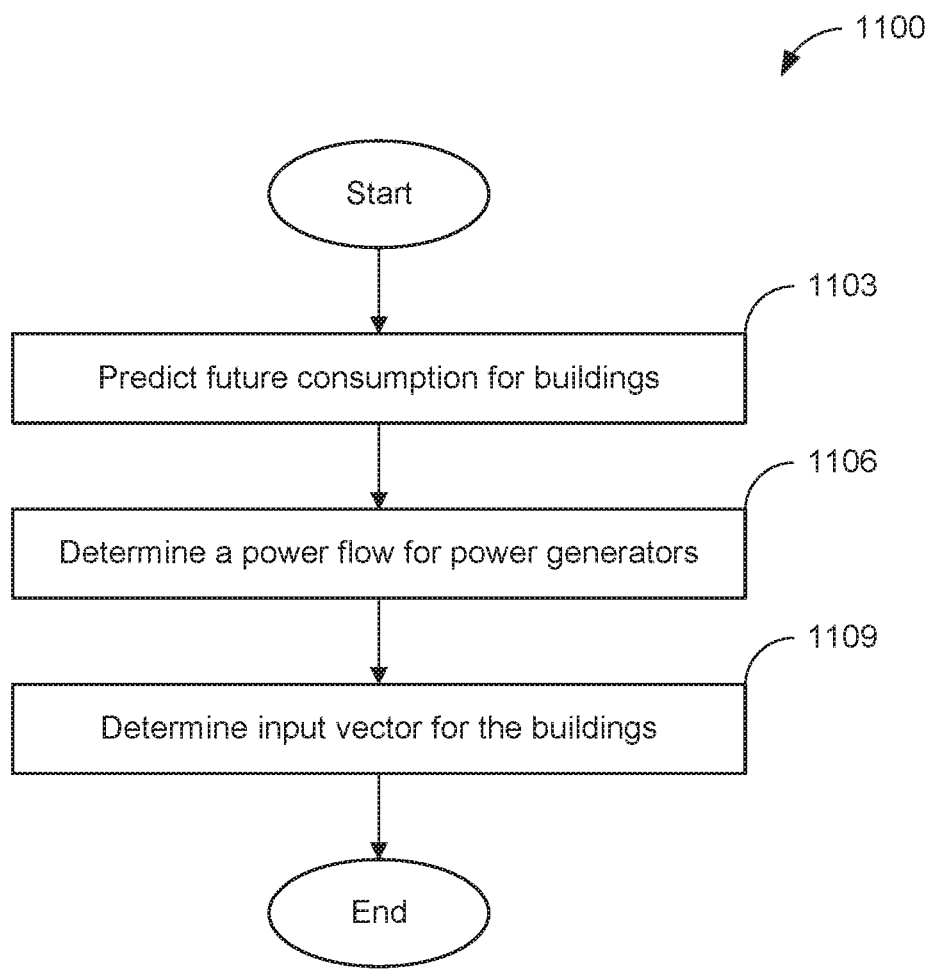
FIG. 11 is an example flowchart of certain functionality implemented by portions of an optimization application according to various embodiments.

With reference to FIG. 11, shown is a flowchart that provides one example of a process 1100, which can be implemented as a portion of the optimization application according to various embodiments. It is understood that the flowchart of FIG. 11 provides merely an example of the many different types of functional arrangements that may be employed to implement the operation of the portion of the optimization application as described herein. As an alternative, the flowchart of FIG. 11 may be viewed as depicting an example of elements of a method implemented in the computing device 1200 (FIG. 12) according to one or more embodiments.

Beginning with box 1103, the process 1100 can include predicting future consumption for one or more building. The optimization application can predict a future consumption for the one or more buildings. A future consumption can be predicted for each building based on a respective history of usage for each of the buildings. In some embodiments, the respective history of usage can be used in combination with a history of usage for all of the buildings. The history of usage can include local climates for each building, mass and heat transfer for each building, daily operator of each building, and occupancy behavior for each building.

At box 1106, the process 1100 can include determining a power flow for one or more generators. As an example the optimization application can determine a power flow for the generators based on the predictions of future consumption for the buildings. The power flow can be set to ensure enough energy is available to provide power for the buildings without exceeding the thermal limits of the network.

At box 1109, the process 1100 can include determining an input vector for the buildings.

$$u_b(t) = \begin{bmatrix} P_{HVAC}^{(1)} \dots P_{HVAC}^{(n_b)} \end{bmatrix}^T$$

can be the control input vector for the buildings. The optimization application can determine the input vector, which is defined in (2) as $u_b \in \mathbb{R}^{n_b}$.

Figure 12:
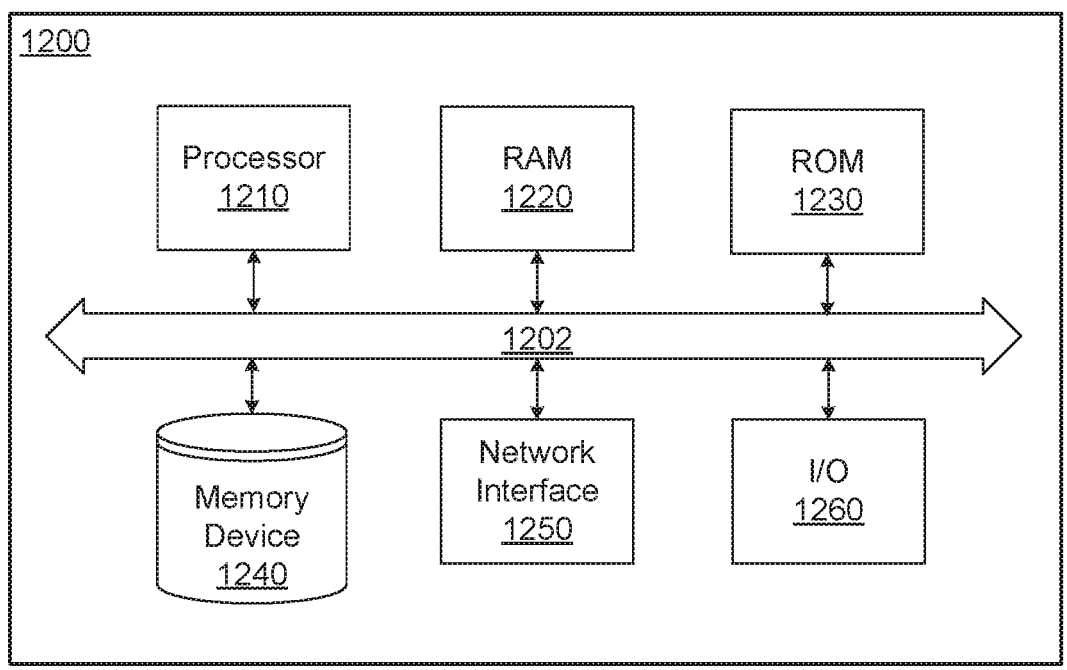
FIG. 12 is a schematic block diagram that illustrates an example computing device according to various embodiments.

Turning to FIG. 12, an example hardware diagram of a computing device 1200 is illustrated. Any of the functionality discussed herein may be implemented, in part, using one or more elements of the computing device 1200. The computer device 1200 includes a processor 1210, a Random Access Memory ("RAM") 120, a Read Only Memory ("ROM") 1230, a memory device 1240, a network interface 1250, and an Input Output ("I/O") interface 1260. The elements of the computer 1200 are communicatively coupled via a bus 1202.

The processor 1210 comprises a general purpose arithmetic processor or Application Specific Integrated Circuit ("ASIC"). The RAM and ROM 1220 and 1230 comprise a random access or read only memory device that stores computer-readable instructions to be executed by the processor 1210. The memory device 1230 stores computer-readable instructions thereon that, when executed by the processor 1210, direct the processor 1210 to execute various aspects of the present disclosure described herein. When the processor 1210 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 1230 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1250 comprises hardware interfaces to communicate over data networks. The I/O interface 1260 comprises device input and output interfaces such as keyboard, pointing device, display, communication, and other interfaces. The bus 1202 electrically and communicatively couples the processor 1210, the RAM 1220, the ROM 1230, the memory device 1240, the network interface 1250, and the I/O interface 1260, so that data and instructions may be communicated among them.

In operation, the processor 1210 is configured to retrieve computer-readable instructions stored on the memory device 1240, the RAM 1220, the ROM 1230, or another storage means, and copy the computer-readable instructions to the RAM 1220 or the ROM 1230 for execution, for example. The processor 1210 is further configured to execute the computer-readable instructions to implement various aspects and features of the present disclosure. For example, the processor 1210 may be adapted and configured to execute the processes described above. Also, the memory device 1240 may store the data stored in a database.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A system comprising:
   at least one data store; and
   at least one computing device in communication with the at least one data store, the at least one computing device comprising at least one processor circuit being configured to at least:
   generate a plurality of predictions of future building energy consumption individually corresponding to at least one building of a plurality of buildings, the plurality of predictions of future building energy consumption based at least in part on at least one of a respective local climate about the at least one building, a respective mass and heat transfer property of the at least one building, and a respective occupancy behavior of the at least one building;
   determine a power flow for at least one power generator in a power network supplying the plurality of buildings, the power flow in the power network determined based at least in part on the plurality of predictions of future building energy consumption;
   determine at least one building control input vector for the plurality of buildings based at least in part on the power flow, where building systems of the at least one building are operated or controlled based at least in part upon the at least one building control input vector; and
   maintain a preferred zone temperature within a first building of the plurality of buildings without exceeding respective zone temperature bounds, where dynamics of the preferred zone temperature is represented by $$\dot{T}_{zone}(t) = \frac{T_{wall}(t) - T_{zone}(t)}{C_{zone}R_1} + \frac{T_{amb}(t) - T_{zone}(t)}{C_{zone}R_{win}} + \frac{\dot{Q}_{int}(t) + \dot{Q}_{HVAC}(t)}{C_{zone}}.$$

where $T_{zone}(t)$ and $T_{wall}(t)$ are respectively zone and wall temperatures of the first building, $T_{amb}(t)$ is an ambient temperature outside the first building, $\dot{Q}_{int}(t)$ is a total internal heat gain from heat sources in the first building, $\dot{Q}_{HVAC}(t)$ is a cooling load of the building systems of the first building, $C_{zone}$ is a thermal capacity of the first building, and $R_{win}$ and $R_1$ are thermal resistance parameters of façade elements and walls of the first building.

2. The system of claim 1, wherein the plurality of predictions of future building energy consumption are based at least in part on a control input vector corresponding to the plurality of buildings.

3. The system of claim 1, wherein the at least one computing device is further configured to at least minimize a cost function associated with a cost of operation of the at least one power generator, subject to constraints associated with the power network and the plurality of buildings, and a cost function associated with the cost of the operation of the at least one building, subject to the constraints.

4. The system of claim 1, wherein the at least one computing device is further configured to at least generate a plurality of local control signals for the plurality of buildings and the at least one power generator.

5. The system of claim 1, wherein the at least one power generator comprises a plurality of power generators coupled to a plurality of buses in the power network.

6. The system of claim 1, wherein the plurality of predictions correspond to a prediction horizon.

7. The system of claim 1, wherein the power flow is determined based at least in part on an inertia coefficient and a damping coefficient corresponding to the at least one power generator.

8. A method comprising:
generating, by at least one computing device, a plurality of predictions of future building energy consumption individually corresponding to at least one building of a plurality of buildings, the plurality of predictions of future building energy consumption based at least in part on at least one of a respective local climate about the at least one building, a respective mass and heat transfer property of the at least one building, and a respective occupancy behavior of the at least one building;
determining, by the at least one computing device, an optimal power flow for at least one power generator in a power network supplying the plurality of buildings, the optimal power flow determined based at least in part on the plurality of predictions of future building energy consumption;
determining, by the at least one computing device, at least one building control input vector for the plurality of buildings based at least in part on the optimal power flow, where building systems of the at least one building are operated or controlled based at least in part upon the at least one building control input vector; and
maintaining, by the at least one computing device, a preferred zone temperature within a first building of the plurality of buildings without exceeding respective zone temperature bounds, where dynamics of the preferred zone temperature is represented by $$\dot{T}_{zone}(T) = \frac{T_{wall}(t) - T_{zone}(t)}{C_{zone}R_1} + \frac{T_{amb}(t) - T_{zone}(t)}{C_{zone}R_{win}} + \frac{\dot{Q}_{int(t)} + \dot{Q}_{HVAC}(t)}{C_{zone}},$$

where $T_{zone}(t)$ and $T_{wall}(t)$ are respectively zone and wall temperatures of the first building, $T_{amb}(t)$ is an ambient temperature outside the first building, $\dot{Q}_{int}(t)$ is a total internal heat gain from heat sources in the first building, $\dot{Q}_{HVAC}(t)$ is a cooling load of the building systems of the first building, $C_{zone}$ is a thermal capacity of the first building, and $R_{win}$ and $R_1$ are thermal resistance parameters of façade elements and walls of the first building.

9. The method of claim 8, wherein the plurality of predictions correspond to a prediction horizon.

10. The method of claim 8, further comprising generating, by the at least one computing device, a plurality of local control signals for the plurality of buildings and the at least one power generator.

11. The method of claim 8, further comprising minimizing, by the at least one computing device, a cost function associated with a cost of operation of the at least one power generator, subject to constraints associated with the power network and the plurality of buildings, and a cost function associated with a cost of the operation of the at least one building, subject to the constraints.

12. The method of claim 11, further comprising generating, by the at least one computing device, a plurality of local control signals for the plurality of buildings and the at least one power generator.

13. The method of claim 8, wherein the plurality of predictions of future building energy consumption are based at least in part on a control input vector corresponding to the plurality of buildings.

14. The method of claim 8, wherein the power flow is determined based at least in part on an inertia coefficient and a damping coefficient corresponding to the at least one power generator.

15. A non-transitory computer-readable medium embodying a program that, when executed by at least one first computing device, causes the at least one first computing device to at least:
generate a plurality of predictions of future building energy consumption individually corresponding to at least one building of a plurality of buildings, the plurality of predictions of future building energy consumption based at least in part on at least one of a respective local climate about the at least one building, a respective mass and heat transfer property of the at least one building, and a respective occupancy behavior of the at least one building;
determine a power flow for at least one power generator in a power network supplying the plurality of buildings, the power flow determined based at least in part on the plurality of predictions of future building energy consumption;
determine at least one building control input vector for the plurality of buildings based at least in part on the power flow, where building systems of the at least one building are operated or controlled based at least in part upon the at least one building control input vector; and
maintain a preferred zone temperature within a first building of the plurality of buildings without exceeding respective zone temperature bounds, where dynamics of the preferred zone temperature is represented by $$\dot{T}_{zone}(T) = \frac{T_{wall}(t) - T_{zone}(t)}{C_{zone}R_1} + \frac{T_{amb}(t) - T_{zone}(t)}{C_{zone}R_{win}} + \frac{\dot{Q}_{int(t)} + \dot{Q}_{HVAC}(t)}{C_{zone}},$$

where $T_{zone}(t)$ and $T_{wall}(t)$ are respectively zone and wall temperatures of the first building, $T_{amb}(t)$ is an ambient temperature outside the first building, $\dot{Q}_{int}(t)$ is a total internal heat gain from heat sources in the first building, $\dot{Q}_{HVAC}(t)$ is a cooling load of the building systems of the first building, $C_{zone}$ is a thermal capacity of the first building, and $R_{win}$ and $R_1$ are thermal resistance parameters of façade elements and walls of the first building.

16. The non-transitory computer-readable medium of claim 15, wherein the power flow is determined based at least in part on an inertia coefficient and a damping coefficient corresponding to the at least one power generator.

17. The non-transitory computer-readable medium of claim 15, wherein the plurality of predictions of future building energy consumption are based at least in part on a control input vector corresponding to the plurality of buildings.

18. The non-transitory computer-readable medium of claim 15, wherein the program further causes the at least one computing device to at least minimize a cost function associated with a cost of operation of the at least one power generator, subject to constraints associated with the power network and the plurality of buildings, and a cost function associated with a cost of the operation of the at least one building, subject to the constraints.

19. The non-transitory computer-readable medium of claim 15, wherein the program further causes the at least one computing device to at least generate a plurality of local control signals for the plurality of buildings and the at least one power generator.

20. The non-transitory computer-readable medium of claim 15, wherein the plurality of predictions correspond to a prediction horizon.

* * * * *